(12) United States Patent
Garrou

(10) Patent No.: US 8,539,912 B2
(45) Date of Patent: Sep. 24, 2013

(54) E-TUBE COLLAR

(75) Inventor: Donna Gaye Garrou, Orange, CA (US)

(73) Assignee: Garrouzoo, Inc., Orange, CA (US)

( * ) Notice: Subject to any disclaimer, the term of this patent is extended or adjusted under 35 U.S.C. 154(b) by 0 days.

(21) Appl. No.: 12/590,785

(22) Filed: Nov. 14, 2009

(65) Prior Publication Data

US 2011/0114033 A1    May 19, 2011

(51) Int. Cl.
*A61D 7/00* (2006.01)

(52) U.S. Cl.
USPC .......................... 119/855; 119/856; 604/179

(58) Field of Classification Search
USPC ................. 119/855, 850, 856, 858, 863, 865; 604/174, 179, 180
See application file for complete search history.

(56) References Cited

U.S. PATENT DOCUMENTS

| | | | | |
|---|---|---|---|---|
| 4,031,859 A * | 6/1977 | Stewart | | 119/654 |
| 4,141,322 A * | 2/1979 | Evans et al. | | 119/654 |
| 4,218,991 A * | 8/1980 | Cole | | 119/654 |
| 4,266,511 A * | 5/1981 | Muench | | 119/858 |
| 4,445,894 A * | 5/1984 | Kovacs | | 604/179 |
| 4,671,787 A * | 6/1987 | Widman | | 604/179 |
| 5,048,512 A * | 9/1991 | Turner et al. | | 128/876 |
| 5,342,317 A * | 8/1994 | Claywell | | 604/179 |
| 5,379,726 A * | 1/1995 | Mann | | 119/793 |
| 5,467,743 A * | 11/1995 | Doose | | 119/864 |
| 5,496,282 A * | 3/1996 | Militzer et al. | | 604/179 |
| 5,549,567 A * | 8/1996 | Wolman | | 604/179 |
| 5,638,814 A * | 6/1997 | Byrd | | 128/207.17 |
| 5,653,228 A * | 8/1997 | Byrd | | 128/207.11 |
| 5,664,581 A * | 9/1997 | Ashley | | 128/876 |
| 5,839,393 A * | 11/1998 | Rupp et al. | | 119/712 |
| 5,897,519 A * | 4/1999 | Shesol et al. | | 602/79 |
| 5,941,856 A * | 8/1999 | Kovacs et al. | | 604/179 |
| 6,258,066 B1 * | 7/2001 | Urich | | 604/174 |
| 6,289,903 B1 * | 9/2001 | Haufler | | 132/275 |
| 6,308,332 B1 * | 10/2001 | Tollini | | 2/22 |
| 6,436,074 B1 * | 8/2002 | Lee | | 604/174 |
| 6,497,198 B2 * | 12/2002 | Evans | | 119/858 |
| 6,497,669 B1 * | 12/2002 | Kensey | | 600/573 |
| 6,553,945 B2 * | 4/2003 | Rice | | 119/821 |
| 6,675,744 B1 * | 1/2004 | Levan | | 119/858 |
| 7,168,394 B2 * | 1/2007 | Berry | | 119/863 |
| 7,284,730 B2 * | 10/2007 | Walsh et al. | | 248/74.3 |
| 7,611,493 B2 * | 11/2009 | Jonsson | | 604/174 |
| 7,632,255 B2 * | 12/2009 | Selch | | 604/317 |
| 2003/0217703 A1 * | 11/2003 | Kiss | | 119/863 |

(Continued)

*Primary Examiner* — Yvonne Abbott
(74) *Attorney, Agent, or Firm* — Knobbe, Martens, Olson & Bear, LLP

(57) ABSTRACT

The invention is a method for protecting the neck of an animal following surgical insertion of an esophagostomy tube. The e-Tube protective collar prevents injury to the surgical site, provides stabilization of the e-Tube and prevents accidental or deliberate removal of the tube by the animal. The collar is constructed of two layers of fabric which encircles the animal's neck and fastens via hook and loop fastener strips under the neck allowing for adjustment of tightness. There is a stitched hole in the fabric for the e-Tube to pass through which is then held stable once the collar is placed around the animal's neck. The collar has a hook and loop fastener strip disposed on the top face to fold over the loose end of longer e-Tubes and hold them flat against the collar. The collar requires minimal dressing for the wound and protects it while allowing it to "breathe". Because of the comfortable fit, the collar can remain on the animal continuously and causes no discomfort or impediment to normal eating, grooming, or play.

19 Claims, 1 Drawing Sheet

(56) References Cited

U.S. PATENT DOCUMENTS

Figure 1:

| | | | |
|---|---|---|---|
| 2005/0132981 A1* | 6/2005 | Berry | 119/856 |
| 2006/0278178 A1* | 12/2006 | Morrison-Gale | 119/858 |
| 2006/0283402 A1* | 12/2006 | Smith et al. | 119/863 |
| 2007/0034165 A1* | 2/2007 | Yang | 119/863 |
| 2007/0199521 A1* | 8/2007 | Winestock | 119/855 |
| 2011/0030623 A1* | 2/2011 | Colangelo | 119/855 |

* cited by examiner

E-TUBE COLLAR

FIELD OF THE INVENTION

The present invention relates generally to a collar for animals, and more specifically to an adjustable collar which holds an esophagostomy tube stable against the animal, thereby preventing trauma to the exit site where the e-Tube extends out of the animal's body and reducing the chance of removal by the animal.

DESCRIPTION OF THE RELATED ART

Esophagostomy tubes (e-Tubes) are narrow, flexible tubes that are surgically inserted into the neck and esophagus of animals that cannot or will not eat normally due to oral or metabolic disease or other processes. Such situations commonly arise in animals receiving chemotherapy for cancer with accompanying nausea, those having oral pain or tumors, etc. Caregivers pass formula and medications through the e-Tubes to ensure adequate nutrition for a period which may last for weeks or months.

The e-Tube is a foreign agent to the animal's immune system, and the insertion point remains as an open wound. Common problems with e-Tube patients include damage from the animal scratching at the wound/insertion site, stitches or the tube itself, infection, or tube removal by the animal. The tube is attached to the neck skin with sutures which can break away from the skin after days or weeks, leaving the tube unanchored, and if not adequately bandaged, the animal can dislodge and remove the tube by vigorously shaking its head or pawing the e-Tube out.

The e-Tube must therefore be covered to prevent these problems and traditionally has been bandaged. In an ideal setting, a bandage should have a contact layer, an absorbent layer, and an outer layer. The absorbent layer is in place to absorb liquid from the wound when it is fresh, and to hold the contact layer in place. Once the wound has begun to heal, this layer may not be necessary. The outer layer functions to support the contact layer. It should be in contact with the skin at the bandage margins, anchoring the bandage so it will not slip. It should be applied smoothly and snugly, but not tight enough to cut off blood circulation. The current method employed by veterinarians is to place a non-adherent pad over the e-Tube exit site, encircle the animal's neck with gauze and cover that with adhesive bandage. This bandaging method has numerous disadvantages; it gets wet easily, does not stabilize the e-Tube which may be dangling outside it, rolls up and shifts on the animal's neck, frays and catches in the animal's nails, and is difficult to apply at the appropriate snugness without suppressing breathing. Therefore, it has to be replaced by the veterinarian or technician frequently and cannot easily be changed at home by the pet owner.

In an effort to reduce the pet scratching at the hanging gauze and/or tube, some veterinarians recommend having the pet wear a plastic frustroconical shaped collar, such as an Elizabethan collar (U.S. Pat. No. 3,036,554 issued May 29, 1962 to F. L. Johnson) in addition to the bandaging. The collar extends radially from the head and restricts movement of the neck, which creates additional problems; the pet may have trouble drinking water, resting comfortably, and even seeing in order to behave normally. Cats in particular may not tolerate an Elizabethan collar at all.

Other attempts to protect animals from scratching or injuring surgery sites are the Soft E-Collar, a variation of the Elizabethan collar wherein the conical shape is replaced by a shorter, more doughnut-shaped collar, and the Pro Collar, an inflatable version of a doughnut-shaped collar. The inflatable collar is dependent on the animal not scratching the area, as doing so may puncture the collar and result in deflation.

Winestock (U.S. Pat. No. 7,743,736) describes "a collar device that limits the head movement for a canine or feline patient while the pet is recuperating from surgery or injury." The Winestock collar is designed to be more durable, citing as an objective "to provide a collar that has high tensile strength". To accomplish this goal, the collar "incorporates a flexible (i.e. nonrigid) yet impact-resistant material, such as plastic, as one of its layers, thus simultaneously providing both flexibility and protection from impact." The intermediate layer is described as providing "substantially rigid structural support for the device".

In marked contrast to the use of an Elizabethan collar, doughnut shaped recovery collar or a rigid collar such as described by Winestock, the present invention allows complete freedom of movement with no restriction of movement, allowing the animal to eat, sleep, drink, groom, and play normally. There is no intent to prevent movement of the head or access to any body part. The present invention incorporates a top layer of soft fabric, a second layer of padding, and a bottom layer of plush material, all joined together, to create a completely soft and flexible collar. The invention protects the surgery site by covering it with soft comfortable material and doed not restrict movement in any way.

This comfort and flexibility is critical for the intended use with e-Tube patients because of the potential for long-term use of the item, whereas prior inventions have been designed for surgical recovery, which is a more short-term purpose.

In addition, Elizabethan, rigid (Winestock) and doughnut shaped collars must be removed from the animal prior to performing diagnostics (such as radiographs, ultrasound, and MRI) and treatments. The present invention can continue to stay in place and protect the tissue during diagnostic procedures.

Another application that requires a tube insertion site that needs to be protected is the case of human peritoneal dialysis; briefly, this involves use of an abdominal catheter tube, through which a sterile cleansing fluid is passed and then collected, taking waste with it. Issues such as protection of the catheter insertion site are shared with the present invention; as are the need for fulltime and long-term use, and the need to prevent infection and trauma to the insertion site. To that end, Militzer, et al (U.S. Pat. No. 5,496,282) created "belt-like articles of clothing, and more particularly . . . a stretchable and adjustable belt which holds a peritoneal dialysis catheter device stable against a user, thereby virtually preventing any trauma to an exit site from which the catheter device extends out of the user's body". A necessary feature when dealing with the abdomen is the fluctuating size of the abdomen; Militzer states that "additional advantages of the preferred embodiment include the belt being manufactured from a woven and elastic material, thereby providing slight compression to abdominal bloat while it still remains expandable and adjustable to allow for bloat". In contrast, when dealing with a neck location, such as with an e-Tube, there is no need for compression and in fact any type of compression is highly undesirable, because the trachea ("windpipe") runs parallel with the esophagus down the length of the neck.

In the prior art, self-adherant conforming bandage (3M™ Vetrap™) was frequently used, which has the potential to compress the airway and cause breathing difficulties when applied too snugly. When applied too loosely, the conforming bandage does not hold and spins around the neck or allows the animal to get under it to scratch. Even when conforming bandage is properly applied, the pressure on the underlying layers and the site itself does not allow for any needed airflow to the wound.

Therefore, there exists an urgent need for a covering that will: protect the e-Tube insertion site, hold and stabilize the e-Tube and prevent accidental or deliberate removal, be washable, be easy to apply and remove to facilitate simple dressing and inspection of the wound, allow it to "breathe", stay on continuously, and cause no discomfort to the animal nor be an impediment to normal eating, grooming, or play.

SUMMARY OF THE INVENTION

All of the above-mentioned difficulties and problems of the prior art are overcome by the present invention. The present invention is a novel approach for stabilizing an esophagostomy tube against a user. It is a soft, washable, adjustable collar which provides quick and easy access to the e-Tube site for cleaning and inspection and also helps to deter removal by the animal. In addition, unlike the prior art, it allows the pet owner to tend to the wound rather than being reliant on frequent trips to the veterinarian.

More specifically, the present invention includes a rectangular body which encircles the neck of an animal, held firmly in place with hook and loop fastener material which also allows for adjustability. A stitched opening in the fabric allows the proximal end of the e-Tube to pass through and exit to allow access to the port at the end of it for feeding and medicating the animal. A strap of hook and loop fastener positioned to the right of the opening closes firmly around the protruding length of the e-Tube, holding it firmly against the collar (and thus the animal) to prevent the e-Tube from becoming caught in the animal's environment. A small loop of fabric at the ventral base of the collar is provided to allow attachment of the animal's identification tag or medical information.

Precise placement of hook and loop fastener strips will vary according to size and breed of animal, with some models of the collar having two tabs covered in hook and loop fastener material and some having one tab with the receiving hook and loop fastener material sewn into the opposing side of the collar.

Although the drawings show a narrow collar of approximately two inches width, dimensions and thickness of the collar will vary according to the breed and intended use. The collar may be more padded for shorthaired animals and thinner and narrower for longhaired animals, and the position of the hole may vary depending on the position and type of tube placed.

The present invention prevents the problems previously associated with bandaging and protecting an esophageal tube site. No longer is the e-Tube site subject to excessive compression from self-adhesive bandages, nor does the excess length dangle and cause tugging, pulling or excess manipulation of the e-Tube. This reduces irritation, inflammation, and damage to the tissue at the surgical site, all of which can cause infection at the e-Tube site and in extreme cases, the need to remove the e-Tube.

The uniqueness of the invention has been noted and is currently in use by some of the top Veterinary Teaching Hospitals in the U.S., including Texas A & M University Veterinary Medical Teaching Hospital, University of Wisconsin Veterinary Teaching Hospital. Tufts, and University of Georgia Athens. The invention is used in the practices of noted experts in esophageal tube placement and critical care nutrition Dr. Marjorie Scherk, Editor for the Journal of Feline Medicine and Surgery and Dr. Jennifer Devey, Lab Coordinator for The Veterinary Emergency and Critical Care Society as well as many others.

While a particular embodiment of the invention has been described, any animal, mammal bird or reptile having an esophageal or other cranial tube may benefit from this product. As advanced materials become available or surgical techniques change, modifications may be made to improve the patient's comfort by improving this product. Therefore, while the foregoing description has described the principle and operation of the invention in accordance with the provisions of patent statutes, it should be noted that the invention may be practiced as illustrated and described and that various changes in the size, shape and materials may be made within the scope of the appended claims without departing from the spirit and scope of the invention.

BRIE. DESCRIPTION OF THE DRAWINGS

Figure 2:
Figure 3:
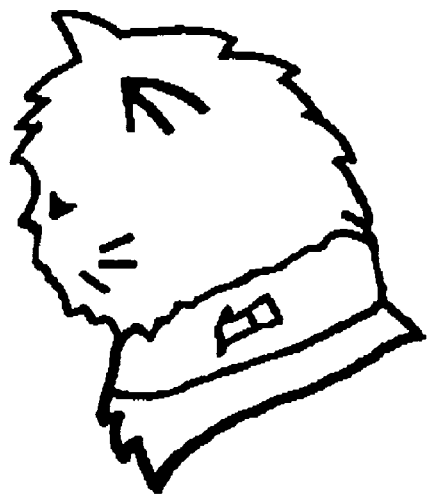
Figure 4:
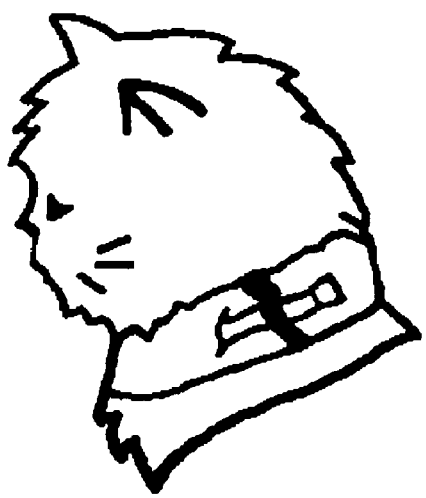

Detail of the invention, and of the preferred embodiment thereof, will be further understood upon reference to the drawings, wherein:

FIG. 1 depicts the dorsal (top) view of the collar.
FIG. 2 depicts the ventral (bottom) view of the collar.
FIG. 3 depicts the collar in use with a short e-Tube.
FIG. 4 depicts the collar in use with a longer e-Tube.

DETAILED DESCRIPTIONS OF THE DRAWINGS

Turning to the drawings, FIG. 1 shows the basic design of the item as discussed in claim 1, looking down the top of it (animal's back). The hole for the e-Tube to pass through is on the left side. The fabric for the top of the collar is an easily cleaned material that will not quickly absorb liquids and can be wiped clean as well as machine washed.

FIG. 2 depicts the underside of the same item (portion that would be against the animal's skin). The material for this side of the item is softer and plusher to add to the comfort of the animal and to contribute to thickness.

FIG. 3 shows the collar in place on a cat with a shorter e-Tube. The collar is firmly fastened about the neck which holds the e-Tube into place. No restraining strap for the e-Tube is necessary.

FIG. 4 shows the collar in place on a cat with a longer e-Tube. The e-Tube has excess length outside the body which is held into place with the hook and loop fastener tabs on the top surface of the collar.

DETAILED DESCRIPTION OF THE INVENTION

The present invention can be embodied in any one of a large number of variations. For example, the invention has application to many types of animals, from birds and reptiles to mammals such as cats and dogs. It also has applications to many sizes of animals, and can be manufactured in sizes that fit a tiny rodent to an elephant. But the most important and frequent application will most likely be to dogs and cats.

The function of the tabs in FIGS. 1 and 2 is to hold the collar firmly in place. The hook and loop fastener material allow for a wide range of adjustability in size and once pressed together will stay in place for a majority of animals. It can be closed tightly enough to prevent sliding or movement of the collar without any compromise to breathing or circulation. Various embodiments may utilize tabs or may have hook and loop sewn directly into the collar which will serve the same purpose.

The small fabric loop hanging from the tab is designed to hang the animal's normal ID tag or a bell on. This attachment will weight the collar slightly, helping to keep it properly oriented toward the front and serving as a convenience to the owner who will no longer be able to use the pet's normal collar. It may also be appropriate to hang a medical ID tag here.

The stitched hole visible on the left side of FIG. 1 and the right side of FIG. 2 (this is the underside of the collar) is a small (¼-½") diameter opening in the fabric to pass the e-Tube through. Once the cap is placed back on the e-Tube (FIG. 3) the tube is held in place.

Some veterinarians and surgeons opt to leave a longer length of tube external to the animal (FIG. 4). In these cases, a strip of hook and loop fastener material is sewn into the collar to hold the excess tube length flat against the collar to protect the tube from damage and getting caught or removed.

REFERENCES CITED

U.S. Patent Documents

U.S. Pat. No. 3,036,554 May 29, 1962 Johnson, F. L.
U.S. Pat. No. 7,743,736 Feb. 13, 2007 Winestock
U.S. Pat. No. 5,496,282 Dec. 12, 1994 Mintzer, et al

What is claimed is:

1. A method of protecting a wound in a neck of an animal, the method comprising:
   inserting an esophagostomy tube through an aperture in a body of a collar; and
   coupling a fastener to a complementary fastener to fasten the collar around the neck of the animal.

2. The method of claim 1, further comprising strapping the esophagostomy tube against the collar.

3. The method of claim 1, further comprising using a loop coupled to the body of the collar to orient the collar.

4. The method of claim 1, wherein inserting the esophagostomy tube through the aperture in the body of the collar includes inserting the esophagostomy tube through a slit in the body of the collar.

5. The method of claim 1, wherein coupling the fastener to the complementary fastener includes adjusting tightness.

6. The method of claim 1, wherein the method does not compromise breathing or circulation of the animal.

7. The method of claim 1, wherein coupling the fastener to the complementary coupling a tab extending from an end of the body to the body.

8. The method of claim 7, wherein coupling the fastener to the complementary fastener comprises linking hook and loop material.

9. The method of claim 1, wherein coupling the fastener to the complementary coupling a first tab extending from a first end of the body to a second tab extending from a second end of the body.

10. The method of claim 9, wherein coupling the fastener to the complementary fastener comprises linking hook and loop material.

11. The method of claim 1, wherein coupling the fastener to the complementary fastener comprises linking hook and loop material.

12. The method of claim 1, wherein the animal is a cat.

13. The method of claim 1, wherein the animal is a dog.

14. The method of claim 1, wherein the animal is one of a bird, a reptile, and a mammal.

15. The method of claim 1, further comprising selecting the collar based on a type of animal.

16. The method of claim 1, further comprising selecting the collar based on a size of the animal.

17. The method of claim 1, further comprising selecting the collar based on a breed of the animal.

18. The method of claim 1, further comprising selecting the collar based on a hair length of the animal.

19. The method of claim 1, further comprising selecting the collar based on a type of the esophagostomy tube.

* * * * *